Figure 4:
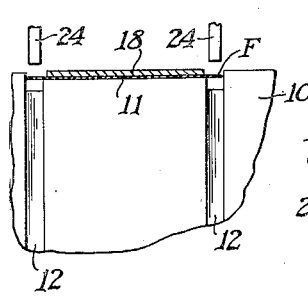

April 5, 1949.  J. C. EVANS  2,466,401

SENSITOMETER AND FILM LOADING MECHANISM THEREFOR

Filed Nov. 8, 1945

JOHN C. EVANS
INVENTOR

BY
ATTORNEYS

Patented Apr. 5, 1949

2,466,401

UNITED STATES PATENT OFFICE 2,466,401

SENSITOMETER AND FILM LOADING MECHANISM THEREFOR

John C. Evans, Rochester, N. Y., assignor to Eastman Kodak Company, Rochester, N. Y., a corporation of New Jersey Application November 8, 1945, Serial No. 627,358

13 Claims. (Cl. 95—10)

This invention relates to a sensitometer of the rotary type and, particularly, to a film-loading mechanism for feeding strips of film to such a device for exposure.

It is common practice in sensitometry to mount the film strip to be exposed in contact with a light modulating step tablet and to endeavor to move this composite tablet and film combination across an elongated exposure aperture for exposure purposes. It is imperative that the exposure time of each of the areas of the step tablet be exactly the same, if a test strip of any value is to be obtained, and very elaborate tablet and film-moving structures have been designed in an effort to obtain this uniform exposure. I have found that this exposure difficulty can be readily overcome by a sensitometer operating on the rotating drum principle. Furthermore, this type of sensitometry lends itself to the rapid and easy production of test strips in that the strips can be easily fed into exposure position and one or more strips of the same, or different, width can be exposed on the same instrument simultaneously and in rapid succession.

One object of the present invention is the provision of a sensitometer which operates on the rotating drum principle;

Another object is to provide a sensitometer on which a plurality of test strips of film of the same, or different, width may be exposed simultaneously and in rapid sequence;

And a further object is to provide a film-loading mechanism for a sensitometer of the type set forth which is semi-automatic in operation and is, therefore, capable of rapid loading without requiring skilled operators;

And another object is to provide a sensitometer in which the film strips are held in contact with the light modulating tablet forming a part of the drum periphery by an endless belt wrapped partially around the drum and driven thereby;

And yet another object is to provide a film-loading mechanism which insures the film strip being properly positioned in superposed relation with the light modulating tablet;

And another object is to provide a film-loading mechanism of the type set forth wherein the test strip of film is positioned into a chute against a film stop and is automatically picked up by the belt at a predetermined time, so that the test strip is properly superposed upon the light modulating tablet;

Another object is to provide a film-loading mechanism for feeding a strip of film onto the periphery of a film drum and holding it flat thereon while the film is moved past an exposure station which is simple in construction and semi-automatic in operation.

Figure 1:
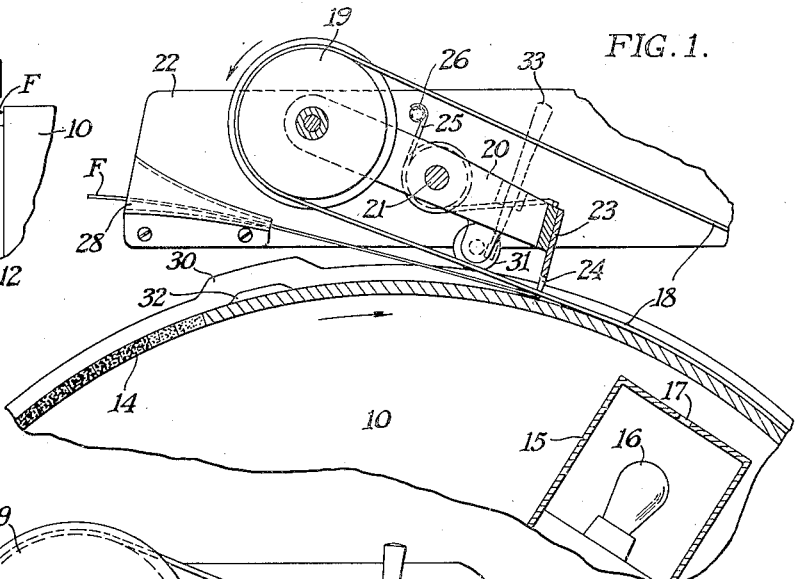
Figure 2:
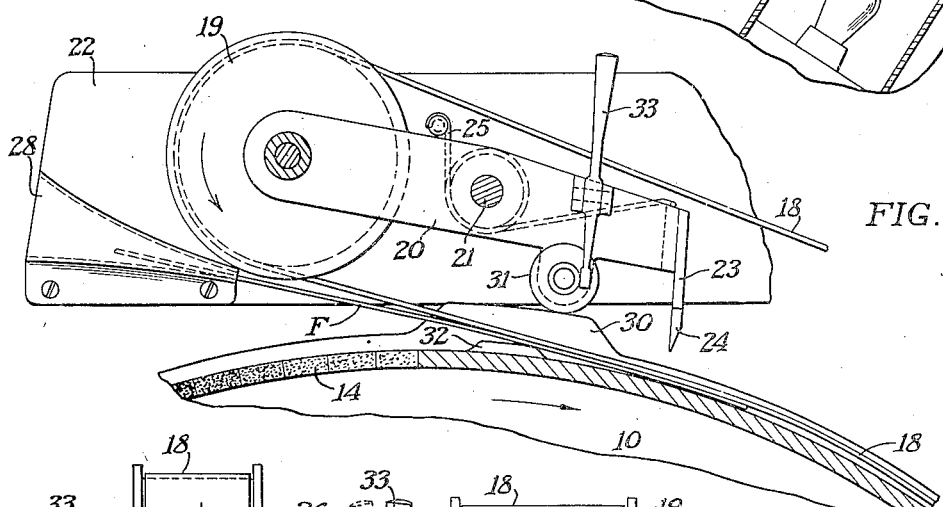
Figure 3:
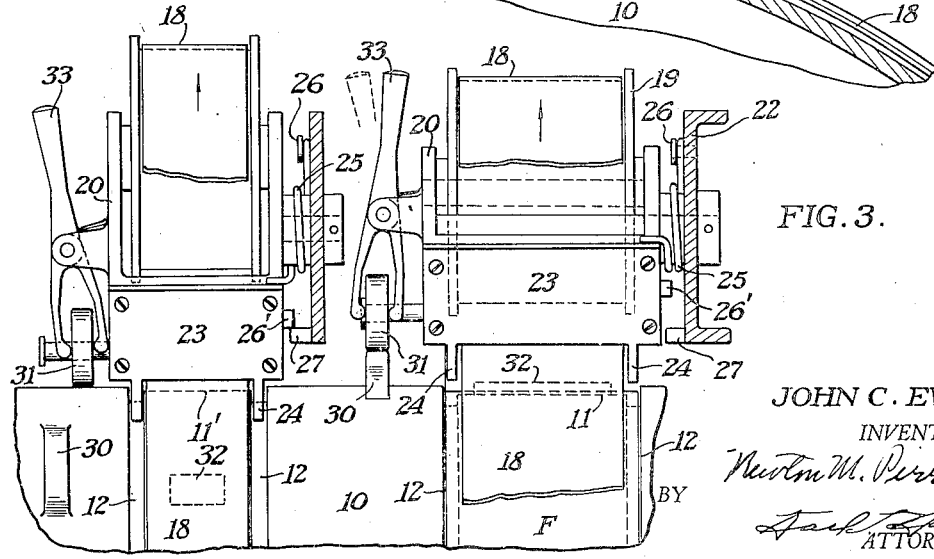

The novel features that I consider characteristic of my invention are set forth with particularity in the appended claims. The invention itself, however, both as to its organization and its method of operation, together with additional objects and advantages thereof, will best be understood from the following description when read in connection with the accompanying drawings, in which Fig. 1 is a partial vertical section of a sensitometer constructed in accordance with a preferred embodiment of the present invention and showing the film-loading mechanism raised to an inoperative position and showing a film strip in the chute in a position to be picked up by the loading mechanism;

Fig. 2 is an enlarged view corresponding to Fig. 1 and showing the film-loading mechanism moved to its operative position and having just picked up the test strip from the chute;

Fig. 3 is a side view of a portion of the sensitometer drum showing how two films of different widths may be handled, and showing how the film-loading mechanism may be placed in and removed from an operating condition; and Fig. 4 is a detailed view of one of the film channels in the sensitometer drum and showing how the film and belt lie therein, and also showing how the stop fingers cooperate with the film path to stop and/or release the film strip inserted into the chute.

Like reference characters refer to corresponding parts throughout the drawings.

In general, the purpose of the present device is to provide a means of rapid sensitometric exposure on successive strips of photographically sensitized materials by the use of a rotating drum sensitometer and a novel film strip loading mechanism for use therewith. The film strips are fed onto the drum of the sensitometer in superposed relation with a light modulating tablet and held flat on the tablet while the two are moved at a known speed past an exposure station. The film-loading mechanism is so arranged that it is normally inoperative and the manual step of the loading operation consists only in inserting a test strip of film endwise into a chute. At a given point in the rotation of the drum to insure proper superposed positioning of the test strip on the tablet, the loading mechanism automatically becomes effective and the strip is pulled from the chute and laid on the tablet and carried across the exposure station therewith. After exposure, the strip drops from the drum into a suitable receptacle associated with the instrument, and the loading mechanism is ready to pick up another strip which has subsequently been inserted into the chute.

Referring now to the drawings, the sensitometer, constructed in accordance with the present invention, comprises a closed drum 10, the periphery of which may be provided with one or more channels 11 and 11' which are substantially the width of the film strips to be exposed, and which are spaced longitudinally of the drum. In Fig. 3, I have shown the channel 11 as being of such a width as to accommodate 35-mm. film, while channel 11' is of a width to accommodate 16-mm. film. However, it will be appreciated by those skilled in the art that any number of film channels of the same, or different, width may be placed along the drum periphery depending upon the length of the drum and the type of work desired. As shown in Fig. 4, the bottom of each film channel is provided with a pair of narrow grooves 12 into which stop fingers 24 of the loading mechanism are adapted to extend, as will be later described. These grooves are of such width that only the perforated margins of the film overhang the same and the picture area of the film strip is not reduced thereby.

In the bottom of each film channel there is located one or more conventional light modulating tablets 14 which generally comprise a series of successive areas of different density. These tablets may be of any desired length and one or more may be placed in each film channel depending upon the diameter of the drum and the lengths of the individual tablets selected. Within the drum there is located one or more closed stationary housings 15, depending upon the number of film channels, in which there is located a light source 16 of known intensity. Each housing includes an optical slit 17 for directing a narrow beam of light onto the periphery of the drum at the film channels, or, stating it another way, to provide an exposure aperture. These beams of light constitute the exposure station of the device because when the tablet and a superposed test film are moved across this slit of light at a known uniform rate each density area of the tablet obtains the same exposure and the density of the corresponding areas of the film strip vary only in accordance with the density of the areas of the tablet. If desired, a stationary drum within the rotating drum may be substituted for the light housings shown. This stationary drum would contain one or more suitable light sources and would also include one or more optical slits in its periphery through which the light would pass to expose the film moved thereacross. The drum is driven at a constant known rate by any suitable form of driving means, not shown, and I have found that with this type of apparatus it is fairly easy to obtain a uniform time of exposure—a necessary condition which the structures of conventional sensitometers have been elaborately designed to achieve without too good results.

The film-loading mechanism for each of the film channels in the drum of the sensitometer is identical so that only one thereof will be described. The film-loading mechanism includes an endless belt 18, only a portion of which is shown in the drawings, which is mounted on a pair of guide rollers, only one of which is shown, at 19 disposed on the frame of a machine, so that the belt is wrapped around a portion of the film channel 11 which is slightly greater in length than the length of the light modulating tablet 14. As shown in Fig. 4, this belt is narrower than the overall width of the film channel, being just wide enough to cover the portion thereof lying between the grooves 12 or the picture width of the film strip. The belt is driven centered in the film channel by rotation of the drum in the direction indicated by the arrows.

The belt supporting roller 19 is rotatably supported at one end of a U-shaped lever 20 which is, in turn, pivoted on a stub shaft 21 fixed to the frame 22 of the device. On the opposite end of the lever 20, there is fixed a plate 23 from the bottom edge of which extend two film stop fingers 24 in straddling relation with the belt. A spring 25, wound around the shaft 21 and having one end fixed against a stud 26 on the frame and having its other end engaging the top of lever 20, normally moves the lever and its associated parts clockwise to an inoperative position, as shown in Fig. 1. In this position of the lever 20, which is determined by the engagement between a lug 26' on the lever with a stop 27 on the frame, the guide roller 19 is raised from the periphery of the drum to reduce the degree of wrap of the belt therewith, and the stop fingers 24 are lowered into the grooves 12 of the channel 11, just short of the bottom thereof.

The test strip of film F is inserted into a chute 28 fixed to the frame 22, this chute being substantially the width of the film and being located to direct the inserted film endwise downwardly into the film channel in a direction substantially tangentially of the drum. In Fig. 1, a film strip is shown inserted into the chute with the loading mechanism in its normally inoperative position. It will be noticed that the end of the film engages the stop fingers 24 which are located just in advance of the nip between the belt and drum so that the film is not fed onto the drum.

The film strip is automatically fed onto the drum in proper superposed relation with the light modulating tablet by the following mechanism. On the periphery of the drum at the side of the film channel 11, and just in advance of the light modulating tablet, there is a short cam 30 which is adapted to engage a roller 31 slidably mounted on a shaft carried by the lever 20 to pivot the lever and its associated parts in a counter-clockwise direction to an inoperative position, that shown in Fig. 2. This causes the simultaneous lowering of the belt guide roller 19 toward the periphery of the drum and the raising of the stop fingers 24 from the film path. As the guide roller 19 is lowered, this increases the wrap of the belt with the film channel and moves the nip between the two up by a sufficient amount to grip the end of the film which has been inserted into the chute. Accordingly, the film strip is gripped between the belt and drum and, in addition to being laid flat over the light modulating tablet by the belt, it is carried in this flat condition by the belt and drum past the exposure station where the desired exposure is made. The exposed film strip will leave the film channel at the point where the belt leaves the surface of the drum and will drop into a suitable receptacle, such as a pocket or drawer in the instrument, not shown.

To insure the end of the film strip being quickly gripped between the belt and drum when the loading mechanism is momentarily dropped to its loading position, a protuberance 32 is located in the bottom of the film channel 11 just in advance of the light modulating tablet and in predetermined relation with the cam so as to force the end of the film strip up against the belt simultaneously with the cam action which raises the stop fingers and lowers the belt. To render one or more of the film-loading mechanisms completely inoperative in the event they are not being used, the roller 31 may be slid axially of its shaft by manual manipulation of the pivoted handle 33 which has a yoke end engaging opposite faces of the roller so as to move the roller into and/or out of the path of the cam 30 associated with the respective film-loading mechanisms. In Fig. 3, the roller of the film-loading mechanism associated with the 35-mm. channel is shown moved into the path of the cam 30 to render that mechanism operative, while the roller 31 associated with the loading mechanism of the 16-mm. channel 11' is shown moved out of the path of cam 30 associated with that mechanism to render the same inoperative.

While I have shown only two film channels on the drum, it will be appreciated that any number of channels can be incorporated in accordance with the length of the drum. Furthermore, depending upon the diameter of the drum, a plurality of tablets may be located circumferentially of each channel so that more than one test strip may be exposed for each rotation of the drum. In the event that more than one tablet is placed circumferentially of each film channel, it will be readily understood that there will be a cam 30 and a protuberance 32 associated with each tablet to operate the film-loading mechanims. In the event of a plurality of film channels being spaced along the drum, a separate exposure light source will be provided for each one, although the beam from a single source may be split by a suitable optical system to service two or more channels.

Although the operation of the present device should be obvious from the above description of the structure thereof, a summary of the operation may prove useful. The operator first chooses the film channel on the circumference of the rotating drum that he desires to use, or that which corresponds to the width of the film strip to be exposed, and then he throws one of the handles 33 so as to engage the roller 31 of the proper loading mechanism with its respective cam 30. With the drum rotating at the selected speed, a test strip of film, 10 or 12 inches in length, is fed into the chute of the chosen channel until it is prevented from further advance by the film stop fingers 24. The film then momentarily remains stationary until lever 20 is pivoted in a counter-clockwise direction against the action of the spring 25 by its associated cam 30. This releases the film stops and lowers the belt while the protuberance 32 presses the end of the film strip up against the belt, thus starting it around the drum. Because the cam 30 is short, the film stop fingers drop down on the margins of the film immediately after starting according to the spring pressure of spring 25. This prevents the film strip from running out of the channel. The exposed film strip drops off the drum into a suitable drawer or receptacle at the point where the belt leaves the drum. Two fingers, not shown, extending into the grooves 12 in the film channel at this point on the drum facilitate removal of the exposed film strip. A succession of strips may be exposed, one for each revolution of the drum if only one tablet is provided in each groove, or a plurality for each rotation if the drum is of sufficient diameter to include more than one tablet in each channel. If two of the handles 33 are thrown for film loading operation, two film strips of different width can be simultaneously carried past their exposure aperture for each revolution of the drum.

While I have shown this film-loading mechanism incorporated with a sensitometer, it will be appreciated that it could be used on any photographic or printing machine of the rotary type where definite width sheets of material possessing some rigidity are to be run through the machine. The use of channels for laterally positioning the film is not absolutely necessary, but such an arrangement aids in laterally guiding the film strip over the exposure aperture and at the same time does away with the need for belt guides.

This rotary sensitometer and its film-loading mechanism has enabled us to expose 12-inch by 35-mm. film strips at a rate of 30 per minute with one light modulating tablet in each channel, whereas an operator upon a conventional sensitometer can expose at best only 12 per minute by exerting appreciably more effort. This rotary sensitometer itself has several distinct advantages over existing types in addition to its speed of operation, namely; (1) restriction of the solid angle of light extended by the light source at the exposing aperture, thus providing uniform illumination of the film, (2) increased intensity of light since the light source may be positioned close to the film, (3) compactness of design, (4) considerable range in choice of exposure set-ups and (5) all-around convenience of operation.

Although I have shown and described certain specific embodiments of my invention, I am fully aware that many modifications thereof are possible. My invention, therefore, is not to be restricted to the specific details of construction shown and described, but is intended to cover all modifications coming within the scope of the appended claims.

Having thus described my invention, what I claim is new and desire to secure by Letters Patent of the United States is:

1. A rotary sensitometer comprising a drum adapted to be driven at a constant known rate; a light-modulating tablet in and constituting a portion of the periphery of said drum; means for illuminating said tablet as the drum rotates, and including an illuminated optical slit within said drum optically aligned with that portion of the periphery of the drum including said tablet; an endless belt; a pair of guide rollers supporting said belt adjacent to the periphery of said drum and holding it in wrapped relation with a portion of the drum, including that point against which the light beam emanating from said optical slit strikes; the guide roller in advance of the exposure position of the drum movable to and from the periphery of the drum to change the degree of wrap of the belt on the drum; means normally raising said guide roller from said drum to produce the minimum angle of wrap; a chute for directing the end of a film strip into the nip between said belt and drum; a stop movable to and from an operative position wherein it prevents the end of said film from passing into said nip; means for normally holding said stop in its operative position; and means for automatically removing said stop and lowering said guide roller to increase the wrap of said belt on the drum sufficiently to advance the nip between the belt and drum to a point to engage the end of said film positioned in said chute when that portion of the drum including said tablet approaches said nip, whereby said film strip is fed onto said drum in superposed relation with said tablet and is carried in such relation past the exposure position.

2. A rotary sensitometer according to claim 1 in which the film stop includes a finger which in its operative position extends into a groove in the periphery of the drum and into the path of the film; an arm pivoted intermediate its ends; said finger mounted on one end of said arm and the movable guide roller mounted on the other end of said arm, whereby when the guide roller is moved to its raised position, the finger is moved to its operative position, a spring normally urging said arm to a position where the guide roller is raised and the finger is moved to its operative position; and means for momentarily pivoting said arm against said spring to feed said film strip onto said drum in superposed relation with said tablet.

3. A rotary sensitometer according to claim 1 in which the film stop includes a finger which in its operative position extends into a groove in the periphery of the drum and into the path of the film; an arm pivoted intermediate its ends; said finger mounted on one end of said arm and the movable guide roller mounted on the other end of said arm, whereby when the guide roller is moved to its raised position, the finger is moved to its operative position; a spring normally urging said arm to a position where the guide roller is raised and the finger is moved to its operative position; and means for momentarily pivoting said arm against said spring to feed said film strip onto said drum in superposed relation with said tablet; said last mentioned means including a cam on the periphery of said drum in predetermined relation with the forward end of said tablet to insure said film strip being picked up by and held in superposed relation with said tablet by said belt.

4. A rotary sensitometer according to claim 1 in which the film stop includes a finger which in its operative position extends into a groove in the periphery of the drum and into the path of the film; an arm pivoted intermediate its ends; said finger mounted on one end of said arm and the movable guide roller mounted on the other end of said arm, whereby when the guide roller is moved to its raised position, the finger is moved to its operative position; a spring normally urging said arm to a position where the guide roller is raised and the finger is moved to its operative position; and means for momentarily pivoting said arm against said spring to feed said film strip onto said drum in superposed relation with said tablet; said last mentioned means including a cam on the periphery of said drum in predetermined relation with the forward end of said tablet, a roller carried by said arm and held in rolling engagement with the peripheral portion of said drum including said cam.

5. A rotary sensitometer according to claim 1 in which the film stop includes a finger which in its operative position extends into a groove in the periphery of the drum and into the path of the film; an arm pivoted intermediate its ends, said finger mounted on one end of said arm and the movable guide roller mounted on the other end of said arm, whereby when the guide roller is moved to its raised position, the finger is moved to its operative position; a spring normally urging said arm to a position where the guide roller is raised and the finger is moved to its operative position; and means for momentarily pivoting said arm against said spring to feed said film strip onto said drum in superposed relation with said tablet; said last mentioned means including a cam on the periphery of said drum in predetermined relation with the forward end of said tablet, a roller carried by said arm and held in rolling engagement with the peripheral portion of said drum including said cam; and a protuberance on the periphery of said drum adjacent the forward end of said tablet and in predetermined relation with said cam adapted to force the leading end of the film in said chute up against said belt substantially simultaneously at the time the cam engages said roller.

6. A rotary sensitometer according to claim 1 in which the film stop includes a finger which in its operative position extends into a groove in the periphery of the drum and into the path of the film; an arm pivoted intermediate its ends; said finger mounted on one end of said arm and the movable guide roller mounted on the other end of said arm, whereby when the guide roller is moved to its raised position, the finger is moved to its operative position; a spring normally urging said arm to a position where the guide roller is raised and the finger is moved to its operative position; and means for momentarily pivoting said arm against said spring to feed said film strip onto said drum in superposed relation with said tablet; and means for rendering said film stop and guide roller shifting means inoperative.

7. A rotary sensitometer according to claim 1 in which the film stop includes a finger which in its operative position extends into a groove in the periphery of the drum and into the path of the film; an arm pivoted intermediate its ends; said finger mounted on one end of said arm and the movable guide roller mounted on the other end of said arm, whereby when the guide roller is moved to its raised position, the finger is moved to its operative position; a spring normally urging said arm to a position where the guide roller is raised and the finger is moved to its operative position; and means for momentarily pivoting said arm against said spring to feed said film strip onto said drum in superposed relation with said tablet; said last mentioned means including a cam on the periphery of said drum in predetermined relation with the forward end of said tablet, a roller carried by said arm and held in rolling engagement with the peripheral portion of said drum including said cam; and means for moving said roller axially of said drum to and from the path of said cam to render the film-feeding device operative and inoperative, respectively.

8. A film-loading mechanism for use in combination with a driven drum on a given portion of the periphery of which a film strip is adapted to be held flat and moved past an exposure station while so held on the drum, and comprising an endless belt supported adjacent the periphery of said drum and normally held in wrapped relation with a portion of the drum including said exposure station and adapted to be driven thereby; means for momentarily increasing the angle of wrap of said belt on said drum to initiate the loading of a film strip onto the periphery thereof; a chute for directing a film strip toward the nip between said belt and drum surface; a film stop normally preventing the end of the film strip from entering said nip when inserted into said chute; and means for automatically and simultaneously increasing the wrap of said belt on the drum to advance the nip between the two to engage the end of film located in said chute and for raising said film stop from the path of the film strip at a given point in the rotation of said drum so that said film strip is located on a given position of the drum as it is moved past said exposure station.

9. A film-loading mechanism according to claim 8 in which said last mentioned means includes a double-ended pivoted arm adjacent the periphery of said drum; a belt guiding pulley mounted on one end of said arm to move to and from the periphery of said drum to increase and decrease the angle of wrap of the belt on said drum; a stop finger mounted on the other end of said arm to move to and from the periphery of the drum and into and out of the path of the film strip in said chute, respectively; means normally forcing said arm in a direction to move said pulley away from said drum and to move said stop finger into the film path; and means associated with said drum for momentarily pivoting said arm from its normal position at a given point in the rotation of said drum.

10. A rotary sensitometer comprising a drum adapted to be rotated at a constant rate; a light modulating tablet in and constituting a portion of the periphery of said drum; means for illuminating said tablet as the drum rotates, and including an illuminated optical slit within said drum optically aligned with that portion of the drum including said tablet; and means for feeding a strip of film onto the periphery of said drum in superposed relation to said tablet and for holding it in contact with said tablet while the latter is exposed to light emanating from said optical slit, and including an endless belt disposed adjacent the periphery of said drum and having a given angle of wrap with that portion of the drum including said tablet, whereby said belt holds the film in contact with said tablet and in combination with said drum feeds the film over said optical slit.

11. A rotary sensitometer comprising a drum adapted to be rotated at a constant rate; a light modulating tablet in and constituting a portion of the periphery of said drum; means for illuminating said tablet as the drum rotates, and including an illuminated optical slit within said drum optically aligned with that portion of the drum including said tablet; and means for feeding a strip of film onto the periphery of said drum in superposed relation to said tablet and for holding it in contact with said tablet while the latter is exposed to light emanating from said optical slit, and including an endless belt supported adjacent the periphery of said drum and held in partial wrapped relation with the portion thereof including said tablet; and means for increasing the angle of wrap of said belt with relation to said drum to pick up and feed a film strip onto the periphery of said drum.

12. A rotary sensitometer comprising a drum adapted to be rotated at a constant known rate, the periphery of said drum provided with a channel substantially the width of the film to be exposed extending circumferentially thereof; a light modulating tablet forming a part of the bottom of said channel and extending circumferentially of said drum; means for illuminating said tablet as the drum rotates, and including an illuminated optical slit within the drum optically aligned with that portion of the periphery of the drum including said tablet; an endless belt disposed adjacent the periphery of said drum and extending into said channel and held in wrapped relation with the arcuate portion of said drum passing the beam of light emanating from said optical slit; means for directing the end of the film strip to be exposed into the nip between the belt and the bottom of said channel, whereby it is picked up and fed in a flat condition across said light beam at a uniform rate.

13. A rotary sensitometer comprising a drum adapted to be rotated at a constant rate; a light modulating tablet in and constituting a portion of the periphery of said drum; means for illuminating said tablet as the drum rotates, and including an illuminated optical slit within said drum optically aligned with that portion of the drum including said tablet; and means for feeding a strip of film onto the periphery of said drum in superposed relation to said tablet and for holding it in contact with said tablet while the latter is exposed to light emanating from said optical slit, and including an endless belt; a pair of guide rollers supporting said endless belt adjacent the periphery of said drum and holding it in wrapped relation with a portion of the periphery of said drum, including that point against which the beam of light emanating from said optical slit strikes; means for directing the end of a film strip toward the nip between the belt and the periphery of said drum; a stop normally preventing the end of said film from being fed into the nip between said belt and the periphery of said drum; and means for automatically removing said stop and causing the film to be fed into the nip between said belt and the periphery of said drum when that portion of the periphery of the drum, including said tablet, approaches said nip, whereby said film strip will be fed onto said drum in superposed relation with said tablet and be carried in such relation past said light beam from the optical slit.

JOHN C. EVANS.

REFERENCES CITED

The following references are of record in the file of this patent:

UNITED STATES PATENTS

| Number | Name | Date |
| --- | --- | --- |
| 551,561 | Skillen | Dec. 17, 1895 |
| 1,621,678 | Morse | Mar. 22, 1927 |
| 1,832,294 | Gent | Nov. 17, 1931 |
| 1,883,884 | Doran | Oct. 25, 1932 |
| 2,153,154 | Nivison et al. | Apr. 4, 1939 |
| 2,186,986 | Nelson | Jan. 16, 1940 |